Patented Aug. 23, 1949

2,480,008

UNITED STATES PATENT OFFICE 2,480,008

CHLORINATED POLYTHENE COMPOSITIONS

Arthur William Anderson, North Arlington, N. J., assignor to E. I. du Pont de Nemours & Company, Wilmington, Del., a corporation of Delaware No Drawing. Application July 25, 1946, Serial No. 686,147

9 Claims. (Cl. 260—41)

This invention relates to chlorinated polythene compositions and, more particularly, to such compositions adapted to be converted to products of reduced solubility and fusibility.

The polymers of ethylene which are solids at normal temperatures, are disclosed and claimed in Fawcett et al. U. S. Patent 2,153,553 and are now known as polythene. Chlorinated polythene is known in the prior art and the preparation of this product is disclosed in Fawcett U. S. Patent 2,183,556 and in application Serial No. 686,149, filed July 25, 1946, in the name of Robert S. Taylor and entitled "Aqueous Suspension Chlorination of Polythene." Usually these chlorinated polythenes are prepared by chlorinating polythene having a molecular weight above 2000. Useful chlorinated polythene may have a chlorine content ranging from 4% to 80% by weight although those having a chlorine content of 20% to 35% are more generally employed in commercial applications.

Chlorinated polythene as normally prepared today without any special treatment after preparation is substantially entirely soluble in a number of organic solvents. In order to be definite, the solubility of the polymer in boiling trichloroethylene will be referred to herein, that is, "soluble chlorinated polythene" as used herein denotes chlorinated polythene which is soluble in boiling trichloroethylene. The ordinary chlorinated polythene prepared today is "soluble."

Chlorinated polythene has many potential uses in the manufacture of flexible sheets, films, coatings, and the like. However, it fuses and becomes tacky when subjected to elevated temperatures, and this behavior is objectionable for certain applications. For example, cloth coated with chlorinated polythene becomes very tacky at temperatures in the neighborhood of 130° C.

It is known that certain rubber vulcanizing agents and accelerators have some effect on the properties of chlorinated polythene and that these may even eliminate the tack at 130° C. However, these curing agents are difficult to control and, more important, they markedly reduce the flexibility and increase the stiffness of the chlorinated polythene. Some inorganic peroxides increase the heat resistance of chlorinated polythene but the stiffness is greatly increased at the same time and the elongation reduced.

An object of the present invention is to provide new chlorinated polythene compositions. A further object is to provide a rapid, practical, and easily controlled method of reducing the fusibility and solubility of chlorinated polythene. Another object is to increase the heat resistance, tack temperature, and tensile strength at elevated temperatures of chlorinated polythene without reducing its flexibility and pliability. A still further object is to provide a novel method for insolubilizing chlorinated polythene. Other objects will be apparent from the description of the invention given hereinafter.

The above objects are accomplished according to the present invention by mixing chlorinated polythene with an oxide of lead and heating such mixture in the presence of a peroxy compound from the group consisting of aromatic per acids, their esters, and aromatic peroxides, at a temperature below the decomposition temperature of the peroxy compound to give a dry, uniform mixture which is then heated at a temperature above such decomposition temperature until at least 55% of the chlorinated polythene is insoluble in boiling trichloroethylene.

The chlorinated polythene, oxide of lead, and peroxy compound may be pre-mixed on heated rolls, in a Banbury, or any other suitable mixing equipment, or in a Werner-Pfleiderer mixer, with or without solvents. The temperature of the pre-mixing operation should be carefully selected below the decomposition temperature of the peroxy compound. The thoroughly mixed components may then be treated by heating in a mold under superatmospheric pressure or between the platens of a press under the application of sufficient heat to cause decomposition of the peroxy compound. The treatment may be effected in an oven at ordinary pressures although this method is not as suitable as when the application of heat is very rapid. Another way of heat treating the composition involves the extrusion of the composition comprising chlorinated polythene and an oxide of lead on wire after which the coated wire is immersed in a solution of a peroxy compound in a medium which swells but does not dissolve the polymer. The solvent is then evaporated and the impregnated coated wire is subjected to a heat treatment at a temperature above the decomposition temperature of the peroxy compound whereby the solubility and fusibility of the chlorinated polythene composition is reduced.

The following examples in which all parts are by weight unless otherwise stated, illustrate specific embodiments of the invention.

*Example I*

100 parts of chlorinated polythene (27% chlorine) were mixed with 40 parts of litharge (PbO) on rolls at 110° C. for about 5 minutes until a uniform blend was obtained. The roll temperature was lowered to 88° C. and 1.5 parts of tertiary butyl perbenzoate were added and the rolling continued for an additional 2 minutes, 88° C. being appreciably below the decomposition temperature of the tertiary butyl perbenzoate. Slabs measuring 5" x 8" x .070" were cut from this blend and two samples were heated in a mold maintained at 143° C., a temperature in excess of the decomposition temperature of the peroxy compound, for 15 minutes and 90 minutes. A 16 hour extraction with boiling trichloroethylene using a Soxhlet extractor dissolved 30% by weight of the 15 minute cured sample while a similar extraction dissolved only 15% by weight of the 90 minute cured sample.

To show the effect of the combined litharge and tertiary butyl perbenzoate, a control was run in which a similar batch of chlorinated polythene together with litharge was prepared as above but containing no tertiary butyl perbenzoate. This control sample was molded at 143° C. for 15 minutes. A 16 hour extraction in boiling trichloroethylene dissolved 83% by weight of the sample. The sample containing litharge and tertiary butyl perbenzoate was not tacky at 130° C. whereas the control sample fused partly after 30 minutes at 130° C.

Example II 100 parts of chlorinated polythene (27% chlorine), 2.0 parts of litharge, and 5.25 parts of a blend of hydrocarbon waxes consisting of 55% microcrystalline hydrocarbon wax and 45% paraffin, were mixed on rolls heated at 110° C. for about 5 minutes. The temperature of the rolls was then lowered to 88° C. and 3.15 parts of di(tertiary butyl)diperphthalate were rolled into the blend and the rolling continued for 2 minutes at this temperature which is below the decomposition temperature of the di(tertiary butyl)diperphthalate. The blended composition was sheeted out and the sheets were heated between the two platens of a press maintained at 149° C., a temperature substantially above the decomposition temperature of the di(tertiary butyl)diperphthalate, for 60 minutes. The treated composition, which was well above 55% insoluble in boiling trichloroethylene, did not become tacky upon heating two 2" x 2" x 0.060" sheets placed together between glass plates for 30 minutes at 130° C. under a one pound weight, whereas a sample of the same composition without the di(tertiary butyl)diperphthalate when subjected to the same test at 130° C., became tacky in 30 minutes and began to fuse.

A rupture temperature test was conducted on a heat-treated sheet 60 mils thick by placing a four pound weight supported on three rounded ($\frac{1}{16}$" diameter) prongs one inch apart on the sheet and gradually increasing the temperature. The rupture temperature of this heat-treated composition was greater than 225° C. while that of a similar composition prepared in the absence of di(tertiary butyl)diperphthalate ruptured at 112° C.

Example III 100 parts of chlorinated polythene (25% chlorine) and 10 parts of litharge (PbO) were compounded on rolls at 110° C. for 5 minutes. The temperature of the rolls was lowered to 93° C. and 3 parts of tertiary butyl perbenzoate were mixed in and the rolling continued for 2 minutes. Sheet 0.060" in thickness were molded in a full flash mold at 155° C. for 15 minutes. In the tack test carried out on two sheets (2" x 2" x 0.060") as described in Example II, the treated sample did not become tacky or stick to itself after 30 minutes at 130° C. The tensile strength at 76.7° C. of the heat-treated sample was 1,089 pounds per sq. in.

A control sample consisting solely of chlorinated polythene (25% chlorine) became tacky at 130° C. when subjected to the above tack test and the two sheets could not be pulled apart. The tensile strength at 76.7° C. was only 715 pounds per sq. in.

In this example the temperature of the rolls while mixing in the tertiary butyl perbenzoate was below the decomposition point of that compound while 155° C., the molding temperature used, was above the decomposition point. The molded sheets containing the tertiary butyl perbenzoate were more than 60% insoluble in boiling trichloroethylene.

It will be understood that the above examples are merely illustrative and that the invention broadly comprises heating a mixture of soluble chlorinated polythene and an oxide of lead in the presence of a peroxy compound of the type described above the decomposition point of such compound to obtain a product of reduced solubility and fusibility.

In the practice of this invention any of the oxides of lead may be used such as litharge (PbO), red lead ($Pb_3O_4$), and lead dioxide. The quantity of oxide of lead used may vary widely as the examples show and the proportion is not sharply critical. As a practical matter, a proportion within the range of 1% to 60%, by weight of the chlorinated polythene, will ordinarily be employed. Less than 1% of the oxide of lead does not produce a polymer with a sufficient amount of infusible material while above 60% does not substantially reduce further the fusibility and tack of the treated polymer. However, for certain applications larger amounts of the lead oxide may be desirable, the amount of lead oxide above 60% serving chiefly as a filler and/or stabilizer for the heat-treated compositions.

Any peroxy compound included in the group of aromatic per acids, their esters, and aromatic peroxides, may be used in this invention. It has been discovered that these peroxy compounds in combination with an oxide of lead have the effect of materially reducing the solubility and fusibility of chlorinated polythene providing the composition is heated to a temperature above the decomposition temperature of the peroxy compound used. Chlorinated polythene treated according to this invention is characterized by being non-tacky at 130° C. and, further, by possessing greatly increased tensile strength at elevated temperatures as compared to untreated chlorinated polythene. Examples of the peroxy compounds which may be used are tertiary butyl perbenzoate, di(tertiary butyl)diperphthalate, isopropyl perbenzoate, diethyl diperphthalate, benzyl perbenzoate, lauryl perbenzoate and the like, monoperphthalic acid, perbenzoic acid, benzoyl peroxide, phthalic acid peroxide and the like.

The proportion of peroxy compound may be varied to some extent but it has been found practical to use from 1% to 5%, by weight of the chlorinated polythene, of tertiary butyl perbenzoate or the molecular equivalent proportion thereof of the other peroxy compounds. In most instances, it is preferred to use 1.5% to 3.0% of the peroxy compound, calculated as tertiary butyl perbenzoate. To those skilled in the art, it will be apparent that a wide variation in the proportions of oxide of lead and peroxy compound are permissible depending upon the degree of insolubility and infusibility desired in the resulting polymer.

The heat treatment according to this invention is carried out by subjecting the composition essentially comprising chlorinated polythene, an oxide of lead, and the peroxy compound, to a temperature at least sufficient to decompose the peroxy compound while in the composition. Usually a temperature in the range of 75° C. to 200° C. will be employed, this, of course, depending somewhat on the decomposition temperature of the particular peroxy compound in the composition. The length of heating period is not critical but may be adjusted with the temperature used and, for practical purposes, the heat treatment is usually carried out for 5 to 90 minutes. In any event, the heat treatment should be sufficient to obtain a chlorinated polythene at least 55% insoluble in boiling trichloroethylene.

Although the compositions of this invention essentially comprise chlorinated polythene, an oxide of lead, and the peroxy compound, there may be mixed therewith before the heat treatment small proportions of other ingredients such as lubricants, softeners, plasticizers, fillers, pigments, stabilizers and other synthetic and natural resins. There is no reason for excluding the presence of a solvent in carrying out this invention and a volatile solvent may be advantageously used in some cases to facilitate mixing of the components. However, the heating of the composition above the decomposition temperature of the peroxy compound will ordinarily be carried out in the complete or substantial absence of solvents or liquids in general. Since the forming of the composition is more readily accomplished while the chlorinated polythene is in its soluble and fusible state, it is preferred that mixing of the components be done at a temperature below the decomposition temperature of the peroxy compound and the heat treatment above the decomposition temperature of the peroxy compound be applied during or, more generally, after the composition is shaped by molding, extruding, rolling into sheets, and the like.

In most applications it is very preferable to incorporate the peroxy compound with the chlorinated polythene and oxide of lead. However, it is within the scope of this invention to prepare a mixture of chlorinated polythene and an oxide of lead, shape it by extrusion or other operation, and then immerse the shaped product in a solution of the peroxy compound, preferably using a solvent which has a swelling action but will not dissolve the polymer, so that the polymer is saturated with the peroxy compound. Thereafter, the solvent is removed by evaporation and the impregnated product subjected to a temperature above the decomposition temperature of the peroxy compound. This procedure is more particularly adapted for use in the coating of wires and cables.

An advantage of this invention is that it provides a practical means of raising the temperature at which chlorinated polythene compositions become tacky, raising the unmolding temperature and increasing the tensile strength at elevated temperatures of such compositions as well as providing compositions with reduced solubility and fusibility. The heat-treated chlorinated polythene compositions of this invention may be used in the form of sheets, films, filaments, coatings and various molded, impregnated and laminated structures for the manufacture of gaskets, diaphragms, packing, grommets, bottle stoppers, primary wire insulation, jacketing material over electrical insulation, electrical insulating tape, electrical waxes, belts, suspenders, monofilaments and yarns, caning strips, shower curtains, raincoats, baby pants, aprons, food wrappings, garment bags, food bowl covers, tobacco pouches, wallets, handbags, luggage covering, furniture upholstery, floor and wall covering and the like.

As many apparently widely different embodiments of this invention may be made without departing from the spirit and scope thereof, it is to be understood that the invention is not limited to the specific embodiments thereof except as defined in the appended claims.

I claim:

1. A chlorinated solid polythene composition adapted to be converted upon heating to a form having reduced solubility and fusibility, said composition essentially comprising soluble chlorinated solid polythene and, by weight of said chlorinated polythene, 1%–60% of an oxide of lead and 1%–5%, calculated as teriary butyl perbenzoate, of a peroxy compound from the group consisting of aromatic per acids, their esters, and aromatic peroxides.

2. A chlorinated solid polythene composition adapted to be converted upon heating to a form having reduced solubility and fusibility, said composition essentially comprising soluble chlorinated solid polythene and, by weight of said chlorinated polythene, 1%–60% of litharge and 1%–5%, calculated as tertiary butyl perbenzoate, of a peroxy compound from the group consisting of aromatic per acids, their esters, and aromatic peroxides.

3. A chlorinated solid polythene composition adapted to be converted upon heating to a form having reduced solubility and fusibility, said composition essentially comprising soluble chlorinated solid polythene, and, by weight of said chlorinated polythene, 1%–60% of an oxide of lead and 1%–5% of tertiary butyl perbenzoate.

4. A chlorinated solid polythene composition adapted to be converted upon heating to a form having reduced solubility and fusibility, said composition essentially comprising soluble chlorinated solid polythene and, by weight of said chlorinated polythene, 1%–60% of litharge and 1.5%–3.0% of tertiary butyl perbenzoate.

5. Process of treating soluble chlorinated solid polythene which comprises mixing said chlorinated polythene with, by weight of said chlorinated polythene, 1%–60% of an oxide of lead and heating the mixture formed in the presence of 1%–5%, calculated as tertiary butyl perbenzoate and by weight of said chlorinated polythene, of a peroxy compound from the group consisting of aromatic per acids, their esters, and aromatic peroxides, at a temperature above the decomposition temperature of said peroxy compound until said chlorinated polythene is at least 55% insoluble in boiling trichloroethylene.

6. Process of treating soluble chlorinated solid polythene which comprises mixing said chlorinated polythene with, by weight of said chlorinated polythene, 1%–60% of an oxide of lead and 1%–5%, calculated as tertiary butyl perbenzoate, of a peroxy compound from the group consisting of aromatic per acids, their esters, and aromatic peroxides, at a temperature below the decomposition temperature of said peroxy compound to give a uniform mixture and then heating said mixture at a temperature above the decomposition temperature of said peroxy compound until said chlorinated polythene is at least 55% insoluble in boiling trichloroethylene.

7. Process of treating soluble chlorinated solid polythene which comprises mixing said chlorinated polythene with, by weight of said chlorinated polythene, 1%-60% of litharge and 1%-5%, calculated as tertiary butyl perbenzoate, of a peroxy compound from the group consisting of aromatic per acids, their esters, and aromatic peroxides, at a temperature below the decomposition temperature of said peroxy compound to give a uniform mixture and then heating said mixture at a temperature above the decomposition temperature of said peroxy compound but not in excess of 200° C. until said chlorinated polythene is at least 55% insoluble in boiling trichloroethylene.

8. Process of treating soluble chlorinated solid polythene which comprises mixing said chlorinated polythene with, by weight of said chlorinated polythene, 1% 60%, of an oxide of lead and 1%-5% of tertiary butyl perbenzoate at a temperature below the decomposition temperature of said tertiary butyl perbenzoate to give a uniform mixture and then heating said mixture at a temperature above the decomposition temperature of said tertiary butyl perbenzoate until said chlorinated polythene is at least 55% insoluble in boiling trichloroethylene.

9. Process of treating soluble chlorinated solid polythene which comprises mixing said chlorinated polythene with, by weight of said chlorinated polythene, 1%-60% of litharge and 1.5%-3.0% of tertiary butyl perbenzoate at a temperature below the decomposition temperature of said tertiary butyl perbenzoate to give a uniform mixture and then heating said mixture at a temperature above the decomposition temperature of said tertiary butyl perbenzoate but not in excess of 200° C. until said chlorinated polythene is at least 55% insoluble in boiling trichloroethylene.

ARTHUR WILLIAM ANDERSON.

REFERENCES CITED

The following references are of record in the file of this patent:

UNITED STATES PATENTS

| Number | Name | Date |
|---|---|---|
| 2,157,997 | Brous | May 9, 1939 |
| 2,249,498 | Schulze | June 15, 1941 |
| 2,261,757 | Fawcett | Nov. 4, 1941 |
| 2,322,756 | Wallder | June 29, 1943 |
| 2,416,061 | McAlevy | Feb. 18, 1947 |